United States Patent [19]
Hara et al.

[11] Patent Number: 5,707,430
[45] Date of Patent: Jan. 13, 1998

[54] SYSTEM FOR MEASURING ADSORBING ABILITY OF CANISTER

[75] Inventors: Takeshi Hara; Teruo Wakashiro; Osamu Kimura; Hiroaki Mihara; Masakazu Kitamoto, all of Wako, Japan

[73] Assignee: Honda Giken Kogyo Kabushiki Kaisha, Tokyo, Japan

[21] Appl. No.: 786,374

[22] Filed: Jan. 17, 1997

[30] Foreign Application Priority Data

Jan. 18, 1996 [JP] Japan .................. 8-006760

[51] Int. Cl.$^6$ .................. B01D 53/04
[52] U.S. Cl. .................. 96/111; 96/113
[58] Field of Search .................. 95/8, 11–13; 96/111, 96/113, 114; 55/270

[56] References Cited

U.S. PATENT DOCUMENTS

| | | | |
|---|---|---|---|
| 2,328,521 | 8/1943 | Wittmann | 96/111 |
| 4,025,324 | 5/1977 | Stackhouse, Jr. et al. | 96/111 |
| 4,318,383 | 3/1982 | Iritani et al. | 96/111 X |
| 4,829,968 | 5/1989 | Onufer | 95/11 X |
| 5,088,466 | 2/1992 | Tada | 55/270 X |
| 5,334,237 | 8/1994 | Lorimer | 55/270 X |
| 5,405,431 | 4/1995 | Eastman | 95/11 |

FOREIGN PATENT DOCUMENTS 63-093323  4/1988  Japan .................. 55/270

*Primary Examiner*—Robert Spitzer
*Attorney, Agent, or Firm*—Nikaido, Marmelstein, Murray & Oram LLP

[57] ABSTRACT

The concentration of a hydrocarbon gas in a gas discharged from a drain port is detected by a break-through gas concentration sensor provided in a discharge pipe connected to the drain port. The entire amount of the hydrocarbon gas discharged from the drain port as a result of breaking-through of an adsorbent layer is collected by a break-through gas collecting means, and the entire amount of the hydrocarbon gas collected by the break-through gas collecting means is detected. Thus, in measuring the adsorbing ability of a canister, the concentration of the hydrocarbon discharged from the canister by the breaking-through can be detected with the passage of time and in a stable manner, whereby a measurement value of an excellent accuracy can be provided by a single measurement.

14 Claims, 6 Drawing Sheets

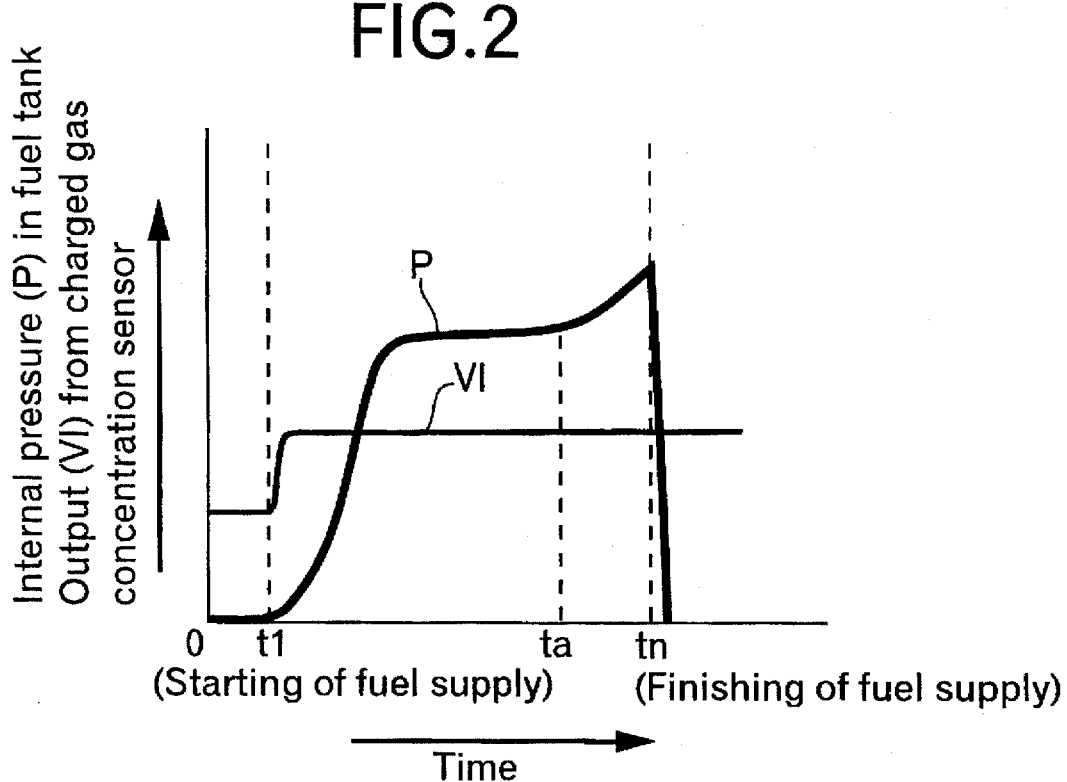
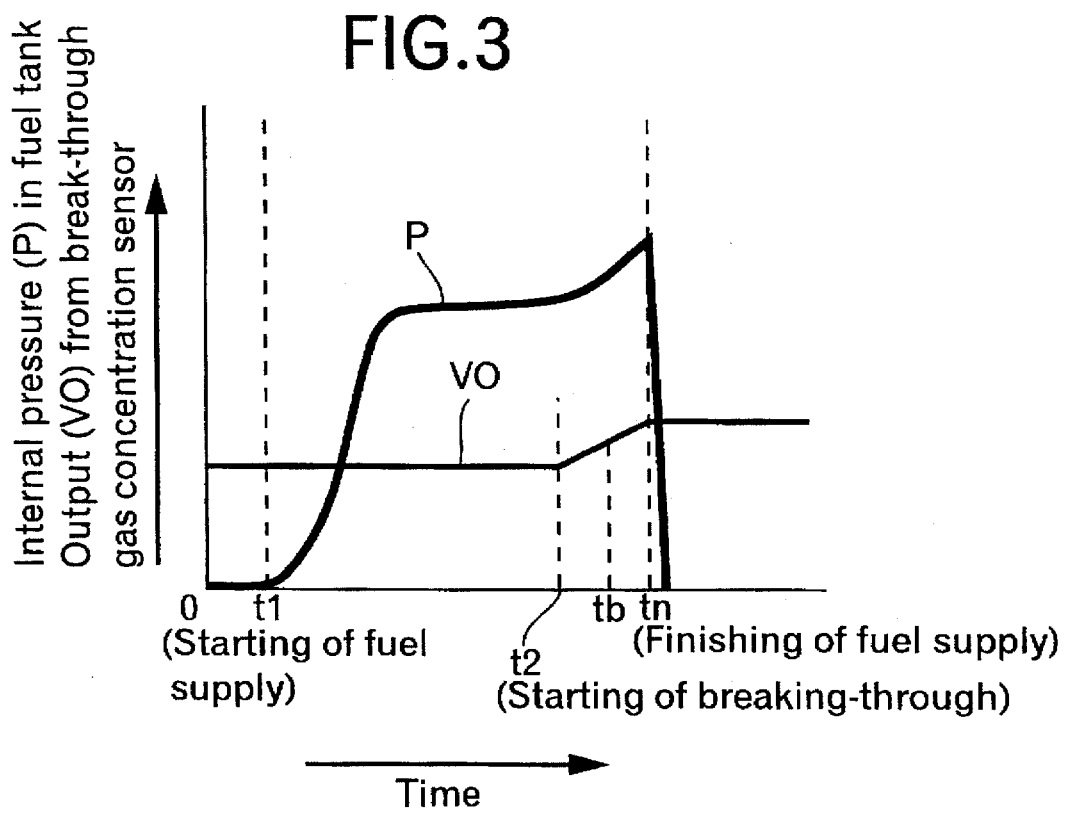

SYSTEM FOR MEASURING ADSORBING ABILITY OF CANISTER

BACKGROUND OF THE INVENTION

1. Field of the Invention

The present invention relates to a system for measuring the adsorbing ability of a canister which includes, at its opposite ends in a direction of flowing of a gas in an adsorbent layer, a charge port connected to a fuel tank and a drain port from which a break-through gas can be discharged.

2. Description of the Related Art

In conventional fuel systems such as that illustrated in FIG. 7, canister 1 connected to a fuel tank 8 to which fuel can be supplied by fuel supply device 9 is disposed in tightly closed chamber 18' in a manner that drain port 4 in the canister 1 opens into tightly closed chamber 18'. The concentration of a hydrocarbon gas in tightly closed chamber 18' is detected by hydrocarbon gas concentration detector 19. A time point when break-through of the canister 1 by hydrocarbon gas begins, and a time point when discharge of a predetermined amount of the hydrocarbon gas from drain port 4 begins (i.e., a measurement finishing timing) are determined by the detection value detected by hydrocarbon gas concentration detector 19, and an adsorbing ability of canister 1 is measured based on a difference between weights of the canister 1 before and after the start of the measurement.

An extremely short time, in the order of several seconds is taken from the starting of break-through of canister 1 to the discharging of the predetermined amount of the hydrocarbon gas. In a system in which the concentration of hydrocarbon gas in tightly closed chamber 18' is detected by hydrocarbon gas concentration detector 19 to determine the break-through starting time point and the measurement finishing timing, the actual time from the break-through of canister 1 to the detection of such break-through by hydrocarbon gas concentration detector 19 is retarded by a significant amount. As a result, the adsorbing ability of canister 1 may be over-estimated, and a measurement error may be increased. It is difficult to detect a variation in break-through amount with the passage of time by the hydrocarbon gas concentration detector 19 in a stable and repeatable manner, because the volume of tightly closed chamber 18' is relatively large and a relatively long time is needed for the determined concentration of the hydrocarbon gas within the tightly closed chamber 18' to be uniform. As a result, in the above conventional system, a line or a break-through curve of relationship between the amount of adsorption by canister 1 and the break-through amount cannot be obtained by a single measurement, and a significant number of measurements are required.

SUMMARY OF THE INVENTION

Accordingly, it is an object of the present invention to provide a system for measuring the adsorbing ability of the canister, wherein the concentration of the hydrocarbon discharged from the canister by the break-through can be detected over time in a stable and repeatable manner, and a measurement value can be obtained by a single measurement, with a high level of accuracy.

To achieve the above object, according to a first aspect and feature of the present invention, there is provided a system for measuring the adsorbing ability of a canister which includes, at its opposite ends in a direction of flowing of a gas in an adsorbent layer, a charge port connected to a fuel tank and a drain port from which a break-through gas can be discharged. The system includes a break-through gas concentration sensor provided in a discharge pipe connected to the drain port for detecting the concentration of a hydrocarbon gas in a gas discharged from the drain port. A break-through gas collecting means is provided for detectably collecting the entire amount of the hydrocarbon gas discharged from the drain port as a result of breaking-through of the adsorbent layer.

With such an arrangement, it is possible to detect the concentration of the hydrocarbon gas in the gas discharged from the drain port without timing retardation by a break-through gas concentration sensor to determine the break-through starting time point and the fuel supply finishing timing in a substantially accurate manner, thereby enhancing the measuring accuracy. In addition, it is possible to provide a break-through curve by a single measurement, because the variation in break-through amount can be detected by the break-through gas concentration sensor with the passage of time.

According to a second aspect and feature of the present invention, the system may further include a charged gas concentration sensor provided between a charge port in the canister and the fuel tank for detecting the concentration of a hydrocarbon gas in an evaporated fuel gas coming from the fuel tank.

Therefore, a variation in adsorption amount can be detected with the passage of time, thereby enhancing the measuring accuracy.

According to a third aspect and feature of the present invention, a water vapor collecting means may be provided between the drain port in the canister and the break-through gas concentration sensor for collecting water vapor in the gas discharged from the drain port.

Therefore, an adverse influence exerted to the break-through gas concentration sensor by the water vapor produced in the canister can be avoided to the utmost, thereby enhancing the ability of the system to accurately measure adsorbing ability.

BRIEF DESCRIPTION OF THE DRAWINGS

The above and other objects, features and advantages of the invention will become apparent from the following description of the preferred embodiments taken in conjunction with the accompanying drawings, wherein:

FIG. 2 is a graph illustrating the variations in output from a charged gas concentration sensor and in internal pressure in a fuel tank over time;

FIG. 3 is a graph illustrating the variations in output from a break-through gas concentration sensor and in internal pressure in the fuel tank over time;

DETAILED DESCRIPTION OF THE PREFERRED EMBODIMENTS

The present invention will now be described by way of preferred embodiments with reference to the accompanying drawings.

Figure 1:
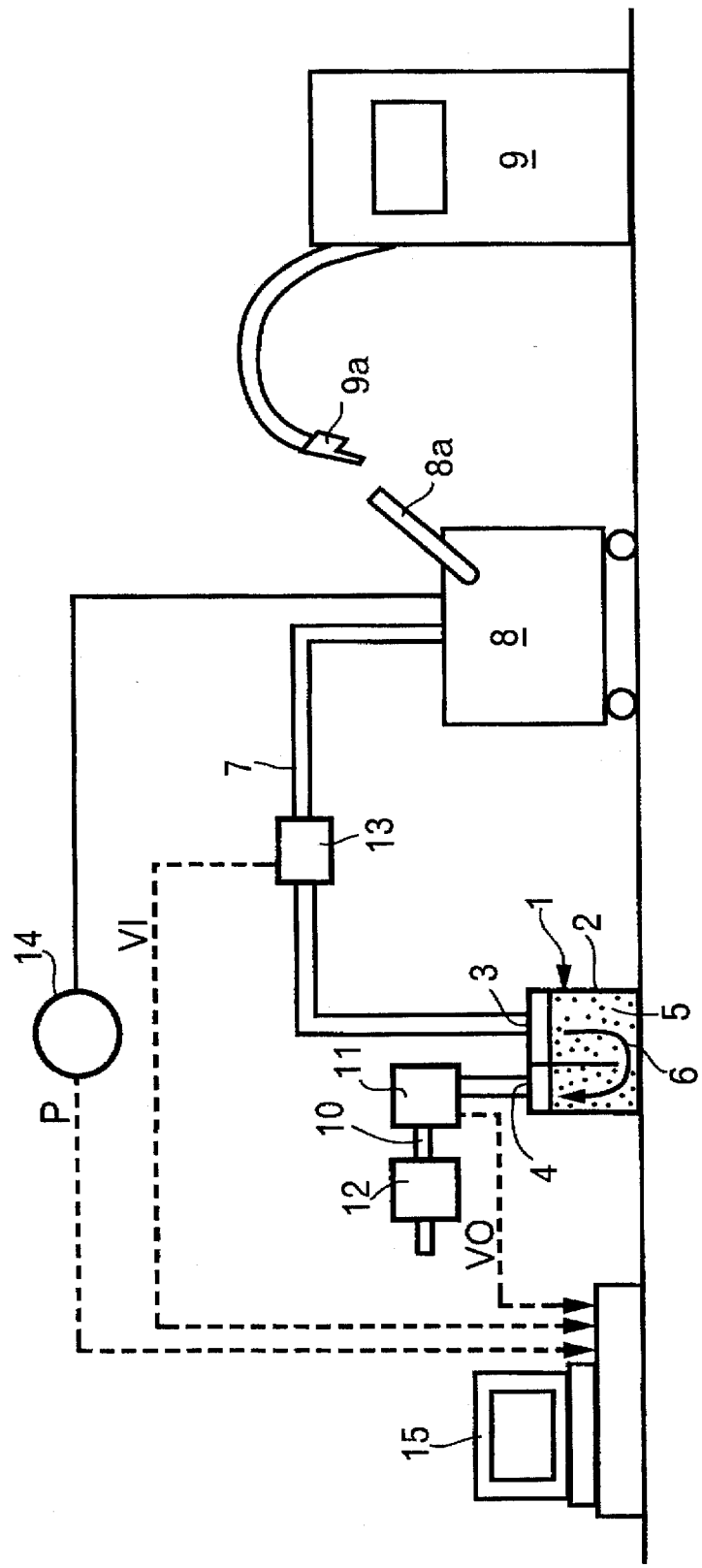
FIG. 1 is a diagrammatic side view illustrating the arrangement of an adsorbing ability measuring system according to a first embodiment of the present invention.

Referring first to FIG. 1, adsorbent layer 5 having an adsorbent such as activated carbon filled therein is provided in casing 2 of canister 1. Casing 2 is provided with charge port 3 which faces one end of adsorbent layer 5 in a gas flow direction 6 in adsorbent layer 5, and drain port 4 which faces the other end of adsorbent layer 5 in gas flow direction 6. Casing 2 is also provided with a purge port (not shown) which faces one end of the adsorbent layer 5. When the adsorbing ability is measured, the purge port is closed.

Evaporated fuel gas conduit 7 connected to fuel tank 8 is connected to charge port 3. During measurement of the adsorbing ability of the canister, fuel supply gun 9a included in fuel supply device 9 is inserted into fuel supply tube 8a of fuel tank 8 to supply fuel to fuel tank 8. Moreover, the volume volume of the fuel tank 8 is set at a large value, as compared with that of a fuel tank which is actually mounted in a vehicle, e.g., such that the evaporated fuel gas can be generated continuously until it breaks through the canister 1, i.e., such that the supplying of the fuel by fuel supply device 9 can be conducted continuously until the evaporated fuel gas breaks through or passes through canister 1.

Exhaust pipe 10 is connected to drain port 4, and break-through gas concentration sensor 11 is provided in discharge pipe 10 for detecting a concentration of hydrocarbon gas in a gas discharged from the drain port 4. Trap canister 12 as a break-through gas collecting means is provided in discharge pipe 10 at a location downstream from break-through gas concentration sensor 11. Break-through gas concentration sensor 11 utilizes a variation in sonic velocity propagated in the gas in accordance with a gas density varied, for example, as a result of a variation in concentration of hydrocarbon gas. Break-through gas concentration sensor 11 detects the hydrocarbon gas concentration based on the detection of the sonic velocity propagated in the gas flowing through discharge pipe 10. Trap canister 12 is constructed to be able to adsorb and collect the entire amount of hydrocarbon gas discharged from drain port 4 as a result of the breaking-through of adsorbent layer 5 within canister 1. Thus, the entire amount of the hydrocarbon gas discharged from drain port 4 as a result of the breaking-through of adsorbent layer 5 can be detected by measuring a variation in the weight of trap canister 12.

Charged gas concentration sensor 13 is provided in the middle of evaporated fuel gas conduit 7 for detecting the concentration of hydrocarbon gas in the evaporated fuel gas coming from fuel tank 8. Charged gas concentration sensor 13 is constructed in the same manner as break-through gas concentration sensor 11. In addition, pressure sensor 14 is added to fuel tank 8 for detecting an internal pressure P thereof.

Detection values detected by break-through gas concentration sensor 11, charged gas concentration sensor 13 and pressure sensor 14 are inputted to data logger 15, and monitored thereby.

The operation of the first embodiment will be described below. During a measurement in which fuel is continuously supplied from the fuel supply device 9 to fuel tank 8 connected to charge port 3 in canister 1, output VI from charged gas concentration sensor 13 and the internal pressure P in fuel tank 8 are varied as shown in FIG. 2. In response to the beginning of supplying fuel at time point t1, output VI from charged gas concentration sensor 13 is sharply increased to a predetermined value, and the internal pressure P in fuel tank 8 is sharply increased. When the supply of fuel to fuel tank 8 is finished at time point tn, the internal pressure P in fuel tank 8 is sharply reduced. On the other hand, output VO from break-through gas concentration sensor 11 and the internal pressure P in fuel tank 8 are varied as shown in FIG. 3. Output VO from break-through gas concentration sensor 11 is increased to a certain level in response to the start of breaking-through of the canister 1 at time point t2 after a lapse of a certain time from the start of supplying of fuel at time point t1. The time when the output VO from break-through gas concentration sensor 11 is further increased at a later time point tn is defined as a fuel-supply finish time point of fuel tank 8, or a measurement finish time point.

After completion of the supplying of fuel to fuel tank 8 at time point tn, the weight of canister 1 is measured. An amount of variation in weight of canister 1 before the start and after the completion of the supplying of fuel to fuel tank 8 is calculated in terms of an adsorption amount $\Delta W_{CT}$ in canister 1, and an amount of variation in weight of the trap canister 12 is calculated in terms of total break-through amount $\Delta W_{TT}$.

On the other hand, the variations in output VI from charged gas concentration sensor 13 and in output VO from break-through gas concentration sensor 11 with the passage of time are stored in data logger 15, as shown in FIGS. 2 and 3. The processing of data of the adsorption amount and break-through amount is carried out based on the data stored in the data logger 15 in the following manner:

First, in order to obtain the adsorption amount $QA_{1-a}$ a for period of time from the fuel supply start time point t1 to a time point ta, a calculation according to the following equation (1) is carried out:

$$QA_{1-a} = \frac{\sum_{i=1}^{a} VI_i}{\sum_{i=1}^{n} VI_i} \times \Delta W_{CT} \tag{1}$$

In order to obtain the break-through amount $QB_{2-b}$ for a period of time from the break-through start time point t2 to a time point tb, a calculation according to the following equation (2) is carried out:

$$QB_{2-b} = \frac{\sum_{i=2}^{b} VO_i}{\sum_{i=2}^{n} VO_i} \times \Delta W_{TT} \tag{2}$$

By conducting the calculations to obtain adsorption amount $QA_{1-a}$ and break-through amount $QB_{2-b}$ according to the equations (1) and (2), variations in adsorption amount $QA_{1-a}$ and break-through amount $QB_{2-b}$ with the passage of time can be determined. Therefore, a break-through curve as shown in FIG. 4 can be obtained.

In this manner, the concentration of the hydrocarbon gas in the gas discharged from drain port 4 can be detected by break-through gas concentration sensor 11 without a timing retardation, whereby timing of the start of the break-through and timing of completion of the supplying of fuel can be precisely determined, thereby providing enhanced measurement accuracy.

Figure 4:
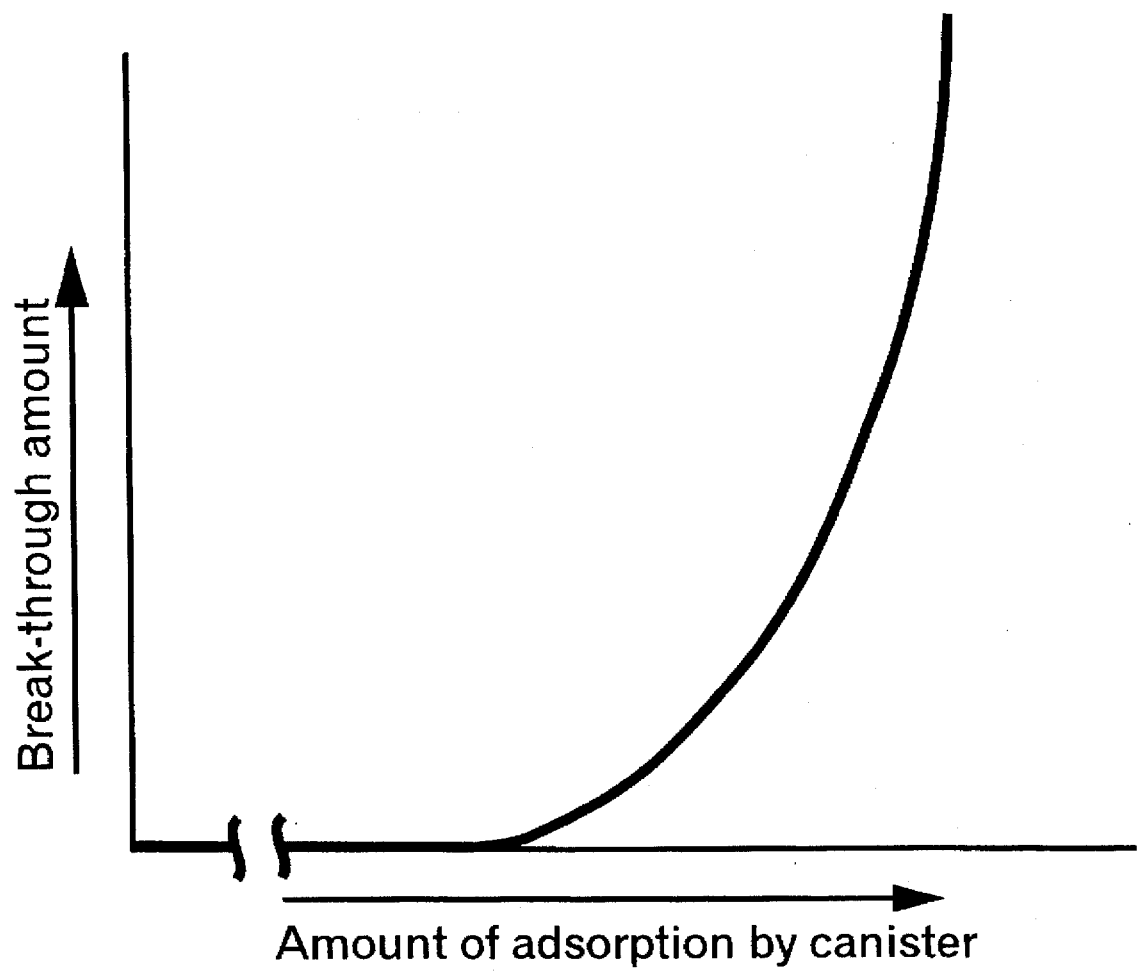
FIG. 4 is a break-through curve provided by the measurement.

Moreover, the variation in break-through amount over time can be detected by break-through gas concentration sensor 11, and the variation in adsorption amount over time can be detected by charged gas concentration sensor 13, thereby providing a break-through curve as shown in FIG. 4 by a single measurement.

It should be noted that when the amount of evaporated fuel gas charged to canister 1 can be maintained constant, charged gas concentration sensor 13 can be omitted.

Figure 5:
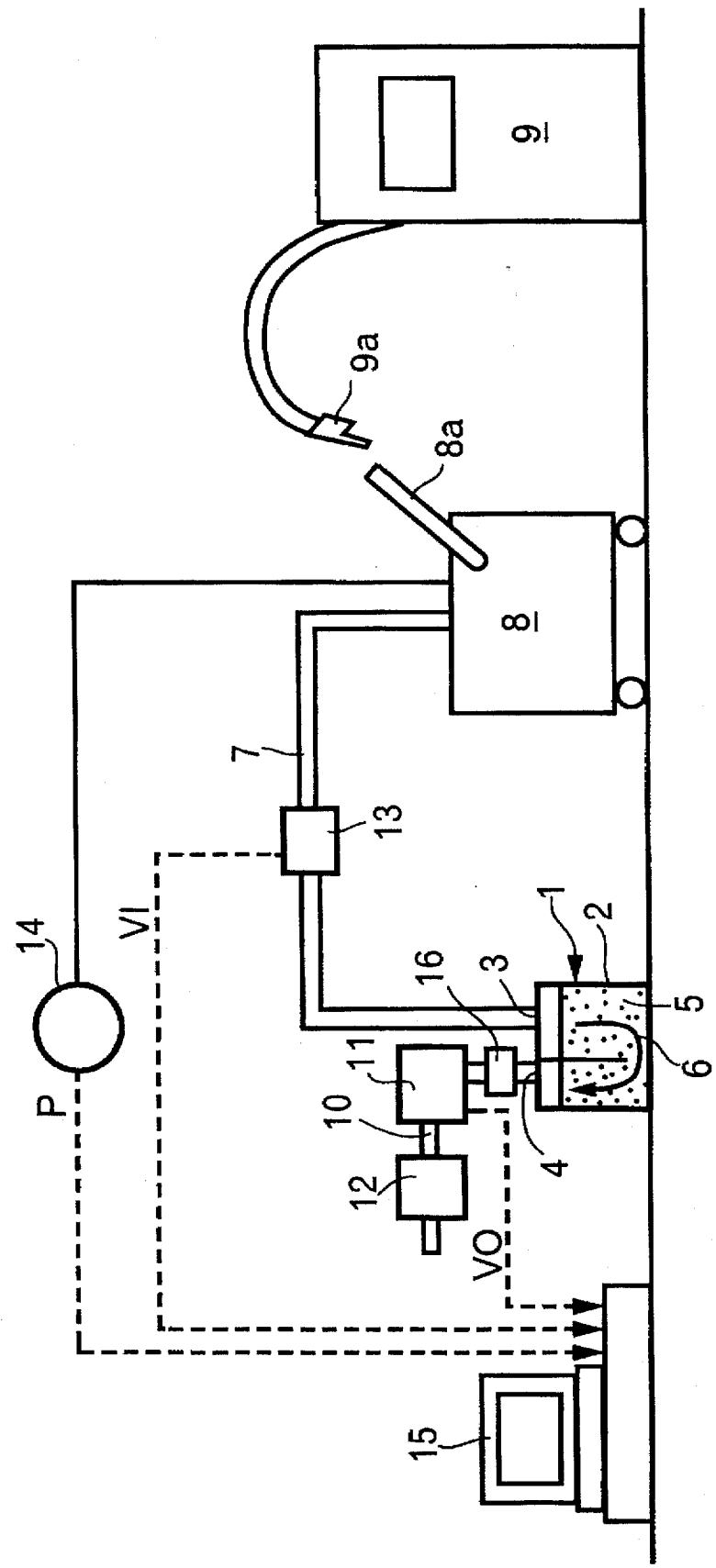
FIG. 5 is a diagrammatic side view illustrating the arrangement of an adsorbing ability measuring system according to a second embodiment of the present invention.

FIG. 5 illustrates a second embodiment of the present invention. In the second embodiment, moisture trap 16 as water vapor collecting means for collecting water vapor in a gas discharged from drain port 4 is provided in discharge pipe 10 between drain port 4 in canister 1 and break-through gas concentration sensor 11. The loss of pressure due to moisture trap 16 is set relatively low, in order to minimize an increase in flow resistance of discharge pipe 10.

Since the gas from which the water vapor has been removed by moisture trap 16 flows to break-through gas concentration sensor 11 side, the accuracy of detection by break-through gas concentration sensor 11 and, in turn, the accuracy of measurement of the adsorbing ability can be enhanced. The water adsorbed in adsorbent layer 5 within canister 1 is evaporated with emission of the heat of the activated carbon caused by the adsorption of the evaporated fuel gas, and a relatively large amount of water vapor is discharged from drain port 4 immediately before the evaporated fuel gas breaks through drain port 4, wherein the output from break-through gas concentration sensor 11 is reduced due to the presence of the water vapor. However, the reduction in output from break-through gas concentration sensor 11 can be avoided by removing the water vapor by moisture trap 16, thereby preventing the water vapor from exerting an adverse effect on the break-through gas concentration sensor 11 to provide a further improved measurement accuracy.

Figure 6:
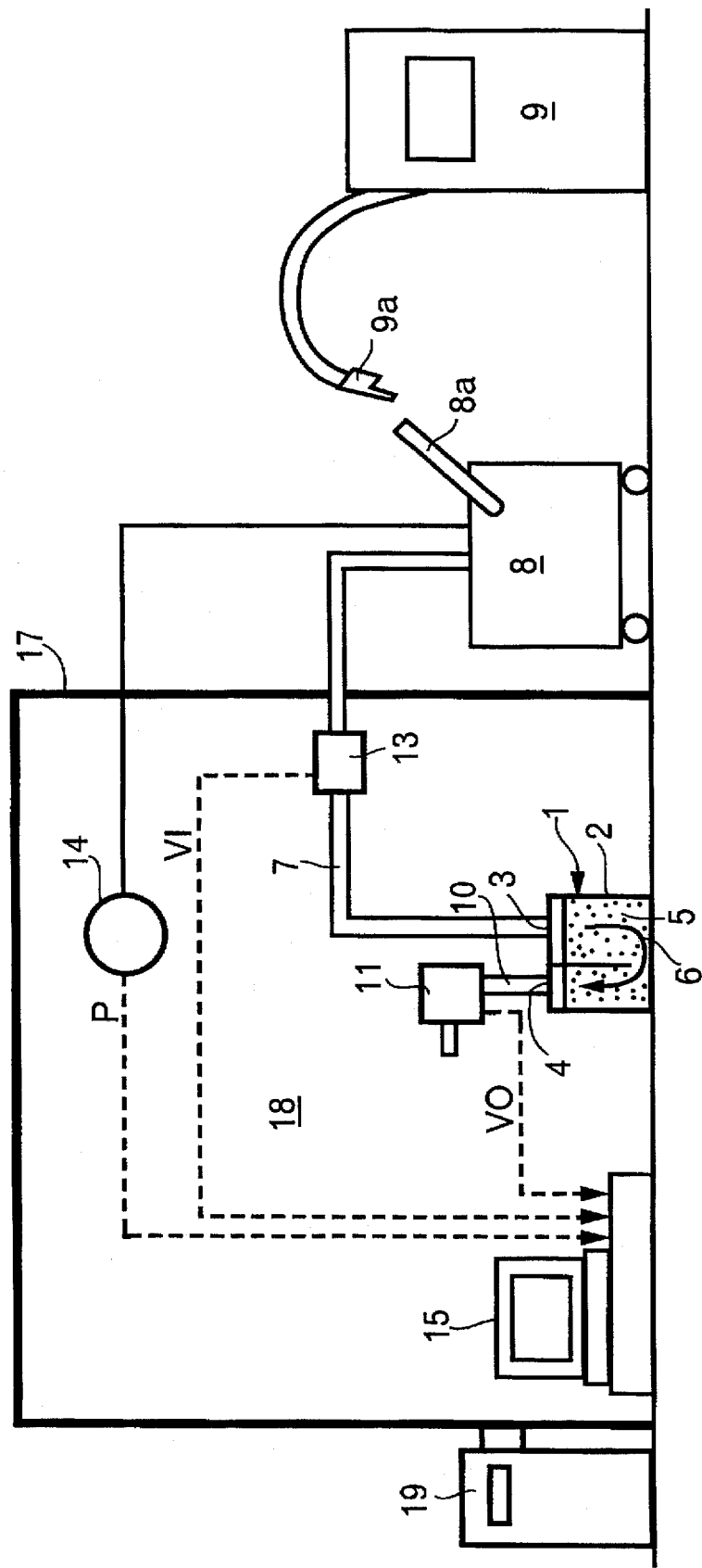
FIG. 6 is a diagrammatic side view illustrating the arrangement of an adsorbing ability measuring system according to a third embodiment of the present invention.
Figure 7:
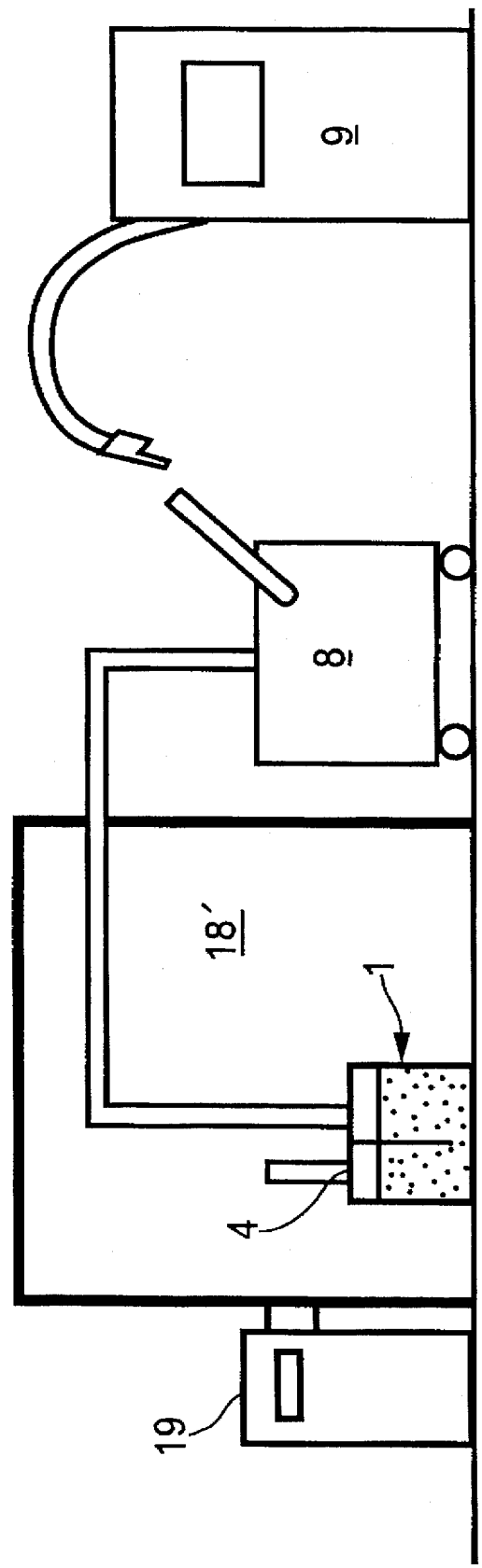
FIG. 7 is a diagrammatic side view illustrating the arrangement of a conventional adsorbing ability measuring system.

FIG. 6 illustrates a third embodiment of the present invention, wherein portions or components corresponding to those in each of the previous embodiments are designated by like reference characters.

Canister 1 is accommodated in tightly closed chamber 18 defined in box 17 as a break-through gas collecting means, and an outer end of discharge pipe 10 connected to drain port 4 in canister 1 and having break-through gas concentration sensor 11 opens into tightly closed chamber 18. Hydrocarbon gas concentration detector 19 is connected to tightly closed chamber 18 for detecting the concentration of a hydrocarbon gas in tightly closed chamber 18.

With the third embodiment, the gas discharged from drain port 4 cannot be discharged out of tightly closed chamber 18, and the entire amount of the hydrocarbon gas discharged from drain port 4 can be collected by box 17. In addition, the time point of starting of the breaking-through and the timing of completion of the supplying of fuel can be determined by break-through gas concentration sensor 11, and the entire amount of the hydrocarbon gas collected by box 17 can be detected based on the hydrocarbon gas concentration detected by hydrocarbon gas concentration detector 19 after completion of fueling.

Therefore, the third embodiment can provide an effect similar to that provided in the first embodiment.

Although numerous embodiments of the present invention have been described in detail, it will be understood that the present invention is not limited to the above-described embodiments, and various modifications in design may be made without departing from the spirit and scope of the invention defined in claims.

For example, in place of the water vapor in the gas discharged from the drain port 4 being collected by the water vapor collecting means, the concentration of the water vapor may be detected by a moisture sensor, and output from the break-through gas concentration sensor 11 may be corrected based on the detection value detected by the moisture sensor.

What is claimed is:

1. A system for measuring adsorbing ability of a canister in an evaporative fuel system, said system comprising:
   a canister having an adsorbent layer therein, with a charge port at a first end of said canister connected to a fuel tank, said charge port being at an upstream side of said adsorbent layer, said canister also including a drain port at a downstream side of said adsorbent layer, said drain port for discharging a break-through gas therefrom;
   break-through gas concentration sensor means connected to said drain port for detecting a concentration of a hydrocarbon gas in the break-through gas discharged from the drain port; and
   a break-through gas collecting means connected to said break-through gas concentration sensor means for detectably collecting the hydrocarbon gas discharged from the drain port.

2. A system as recited in claim 1, further comprising a connecting pipe means for connecting said charge port to said fuel tank, and a charged gas concentration sensor means provided in said connecting means, said charged gas concentration sensor means for detecting the concentration of hydrocarbon gas in an evaporated fuel gas in said connecting means.

3. A system as recited in claim 2, said system further comprising water vapor collecting means attached to said drain port and disposed between said break-through gas concentration sensor and said canister for collecting a water vapor in the gas discharged from said drain port.

4. A system according to claim 2, wherein said canister, said break-through gas concentration sensor means, said break-through gas collecting means, and said charged gas concentration sensor means are disposed in a sealed unit, and wherein said system further comprises a hydrocarbon gas detecting means for detecting an amount of hydrocarbon gas contained in the sealed unit.

5. A system as recited in claim 1, said system further comprising water vapor collecting means attached to said drain port and disposed between said break-through gas concentration sensor and said canister, said water vapor collecting means for collecting a water vapor in the gas discharged from said drain port.

6. A system as recited in claim 5, wherein said canister, said break-through gas concentration sensor means, said break-through gas collecting means, and said water vapor collecting means are disposed in a sealed unit, and wherein said system further comprises a hydrocarb on gas detecting means for detecting an amount of hydrocarbon gas contained in the sealed unit.

7. A system as recited in claim 1, wherein said break-through gas concentration sensor means and said break-through gas collecting means are connected to a data logging means for logging a change in outputs of said means over time.

8. A system according to claim 7, further including a charged gas concentration sensor means provided in a connection means connecting said charge port to said fuel tank, said charged gas concentration sensor means for detecting the concentration of a hydrocarbon gas in an evaporated fuel gas from said fuel tank, said charged gas concentration sensor means being connected to said data logging means wherein said concentration of the hydrocarbon gas in the evaporated fuel gas is monitored over time.

9. A system according to claim 8, wherein said canister, said break-through gas concentration sensor means, said break-through gas collecting means, said data logging means, and said charged gas concentration sensor means are disposed in a sealed unit, and wherein said system further comprises a hydrocarbon gas detecting means for detecting an amount of hydrocarbon gas contained in the sealed unit.

10. A system as recited in claim 7, wherein said canister, said break-through gas concentration sensor means, said break-through gas collecting means, and said data logging means are disposed in a sealed unit, and wherein said system further comprises a hydrocarbon gas detecting means for detecting an amount of hydrocarbon gas contained in the sealed unit.

11. A system according to claim 1, further comprising an internal pressure detecting means connected to the fuel tank, said internal pressure detecting means for detecting an internal pressure of the fuel tank.

12. A system according to claim 11, wherein said break-through gas concentration sensor means, said break-through gas collecting means, and said internal pressure detecting means are connected to a data logging means for detecting a change in output of said means over time.

13. A system according to claim 11, wherein said canister, said break-through gas concentration sensor means, said break-through gas collecting means, and said internal pressure detecting means are disposed in a sealed unit, and wherein said system further comprises a hydrocarbon gas detecting means for detecting an amount of hydrocarbon gas contained in the sealed unit.

14. A system according to claim 1, wherein said canister, said break-through gas concentration sensor means, and said break-through gas collecting means are disposed in a sealed unit, and wherein said system further comprises a hydrocarbon gas detecting means for detecting an amount of hydrocarbon gas contained in the sealed unit.

* * * * *